United States Patent
Yanai et al.

(10) Patent No.: US 10,496,756 B2
(45) Date of Patent: Dec. 3, 2019

(54) SENTENCE CREATION SYSTEM

(71) Applicant: HITACHI, LTD., Tokyo (JP)

(72) Inventors: Kohsuke Yanai, Tokyo (JP); Toshinori Miyoshi, Tokyo (JP); Toshihiko Yanase, Tokyo (JP); Misa Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 86 days.

(21) Appl. No.: 15/507,390

(22) PCT Filed: Oct. 1, 2014

(86) PCT No.: PCT/JP2014/076237
§ 371 (c)(1),
(2) Date: Feb. 28, 2017

(87) PCT Pub. No.: WO2016/051551
PCT Pub. Date: Apr. 7, 2016

(65) Prior Publication Data
US 2017/0286408 A1    Oct. 5, 2017

(51) Int. Cl.
*G06F 17/28* (2006.01)
*G06F 16/332* (2019.01)
(Continued)

(52) U.S. Cl.
CPC ........ *G06F 17/2881* (2013.01); *G06F 16/332* (2019.01); *G06F 17/21* (2013.01);
(Continued)

(58) Field of Classification Search
USPC .............................................. 704/7–10, 257
See application file for complete search history.

(56) References Cited

U.S. PATENT DOCUMENTS 8,239,189 B2 * 8/2012 Skubacz ............. G06F 17/2785
704/10
8,332,394 B2   12/2012 Fan et al.
(Continued)

OTHER PUBLICATIONS

International Search Report for WO 2016/051551 A1, dated Oct. 28, 2014.
(Continued)

*Primary Examiner* — Leonard Saint Cyr
(74) *Attorney, Agent, or Firm* — Volpe and Koenig, P.C.

(57) ABSTRACT

A sentence creation system, which outputs an opinion sentence on an agenda, includes: an input unit into which the agenda is input; an agenda analyzing unit analyzing the agenda and judging the polarity of the agenda and a keyword used for searching; a searching unit searching for articles using the keyword and a disputed point word showing a disputed point in the discussion; a disputed point determining unit for determining the disputed point used for creating the opinion sentence; a sentence extracting unit for extracting sentences in which the disputed point is described among the articles output by the searching unit; a sentence sorting unit for creating sentences by sorting the extracted sentences; an evaluating unit for evaluating the sentences; a paraphrasing unit for inserting appropriate conjunctions into the sentences; and an output unit for outputting the most highly evaluated sentence among the plural sentences as the opinion sentence.

8 Claims, 11 Drawing Sheets

(51) Int. Cl.
*G06F 17/21* (2006.01)
*G06F 17/27* (2006.01)
*G06F 16/31* (2019.01)

(52) U.S. Cl.
CPC ...... G06F 17/2775 (2013.01); G06F 17/2785 (2013.01); *G06F 16/313* (2019.01); *G06F 17/2818* (2013.01)

(56) References Cited

U.S. PATENT DOCUMENTS

| | | |
|---|---|---|
| 2008/0133488 A1 | 6/2008 | Bandaru et al. |
| 2009/0216524 A1* | 8/2009 | Skubacz ............. G06F 17/2785 704/9 |
| 2009/0265307 A1 | 10/2009 | Reisman et al. |
| 2015/0089409 A1* | 3/2015 | Asseily ................. G06Q 10/10 715/765 |

OTHER PUBLICATIONS

Levy et al., "Context Dependent Claim Detection," Proceedings of Coling 2014, the 25th International Conference on Computational Linguistics: Technical Papers, pp. 1489-1500, Dublin, Ireland (Aug. 2014).

The Extended European Search Report dated May 23, 2018 for the European Patent Application No. 14903477.9.

\* cited by examiner

FIG. 2

```
{
  "id": 052511,
  "doc_id": 001122,
  "annotation": "promote",
  "begin": 40,
  "end": 47,
  "ref": {
    "arg0": ["125123"],
    "arg1": ["125124"]
  },
  "attr": {
    "degree": 4,
    "surface": "increase"
  }
}
```

| DISPUTED POINT | PROMOTOR | SUPPRESSOR |
|---|---|---|
| health | exercise, doctor, organ donation, medicine, ... | junk food, tobacco, alcohol, smoking, drug abuse, disease, fatness, ... |
| fortune | money, free of charge, income, ... | cost, crime, tax, ... |
| safety | law, police, army, surveillance, ... | gun, crime, terrorism, ... |
| ... | ... | |

| ID | CONDITION | SCORE |
|---|---|---|
| #1 | NOUN CLAUSE EXTRACTED FROM AGENDA IS INCLUDED | 2 |
| #2 | CONTEXTUAL INFORMATION EXTRACTED FROM AGENDA IS INCLUDED | 1 |
| #3 | WORD IN DISPUTED POINT ONTOLOGY IS INCLUDED | 2 |
| #4 | positive ANNOTATION IS ATTACHED TO WORD WHOSE POLARITY JUDGED AT STEP S402 IS POSITIVE AND TO WHICH promote_arg1 ANNOTATION IS ATTACHED | 4 |
| . | . . | |

SENTENCE CREATION SYSTEM

TECHNICAL FIELD

The present invention relates to a system in which opinion sentences on an agenda are automatically created.

BACKGROUND ART

The usability of a system has been highly estimated which, when receiving a sentence written in a natural language, interprets the sentence, collects information relevant to the input sentence from knowledge sources composed of data written in the natural language, interprets the collected pieces of information, processes the pieces of information, for example, by combining some pieces of information, and proposes the processed pieces of information. An example of such a system as has lately attracted the highest attention is a question-answering system.

For example, Patent Literature 1 discloses a method in which a question-answering system is built up by determining a lexical answer type (LAT), executing a search, and analyzing the search result using the LAT.

CITATION LIST

Patent Literature

Patent Literature 1: U.S. Pat. No. 8,332,394

SUMMARY OF INVENTION

Technical Problem

However, in a case of a debate or the like in which there is not only one right answer but there are various right answers depending on answerers who have various opinions from their own positions, it is difficult to create such various right answers using the technology disclosed in Patent Literature 1. In view of an essay in which opinions on an agenda are expressed in a debate style, since there is no simple right answer and there are various values to be emphasized depending on the positions of answerers, it is impossible to squeeze out one right answer even using the LAT.

In addition, in a case of using the technology disclosed in Patent Literature 1, only a single noun clause or a single sentence is output, therefore a sentence composed of plural sentences cannot be obtained. These problems cannot be solved with the use of the above-mentioned related technology.

The present invention was achieved with the above-mentioned problems in mind, and the object of the present invention is to provide a system capable of automatically creating essays in which opinions on an agenda to be dealt with in a debate are expressed.

Solution to Problem

In order to solve the above problem, the configurations described in the scope of the appended claim will be adopted, for example. The present application includes plural means for solving the above problem, and one example of the plural means will be explained as follows.

This is a sentence creation system for outputting an opinion sentence on an agenda, and the system includes: an input unit into which the agenda is input; an agenda analyzing unit for analyzing the agenda and judging the polarity of the agenda and a keyword used for searching; a searching unit for searching for articles using the keyword and a dispute point word showing a disputed point in the discussion; a disputed point determining unit for determining the disputed point used for creating the opinion sentence; a sentence extracting unit for extracting sentences in which the disputed point is described among the articles output by the searching unit; a sentence sorting unit for creating sentences by sorting the extracted sentences; an evaluating unit for evaluating the sentences; a paraphrasing unit for inserting appropriate conjunctions into the sentences; and an output unit for outputting the most highly evaluated sentence among the plural sentences as the opinion sentence.

Another example is a sentence creation method for outputting an opinion sentence on an agenda, including: a first step for inputting the agenda; a second step for analyzing the agenda and judging the polarity of the agenda and a keyword used for searching; a third step for searching for articles using the keyword and a disputed point word showing a disputed point in the discussion; a fourth step for determining the disputed point used for creating the opinion sentence; a fifth step for extracting sentences in which the disputed point is described among the articles output at the third step; a sixth step for creating sentences by sorting the extracted sentences; a seventh step for evaluating the sentences; an eighth step for inserting appropriate conjunctions into the sentences; and a ninth step for outputting the most highly evaluated sentence among the plural sentences as the opinion sentence.

Advantageous Effects of Invention

By extracting sentences in which a disputed point is described and sorting the sentences, an opinion sentence in which appropriate opinions in accordance with various positions are described can be created.

DESCRIPTION OF EMBODIMENTS

An embodiment of the present invention will be explained with reference to the accompanying drawings.

First Embodiment

Figure 12:
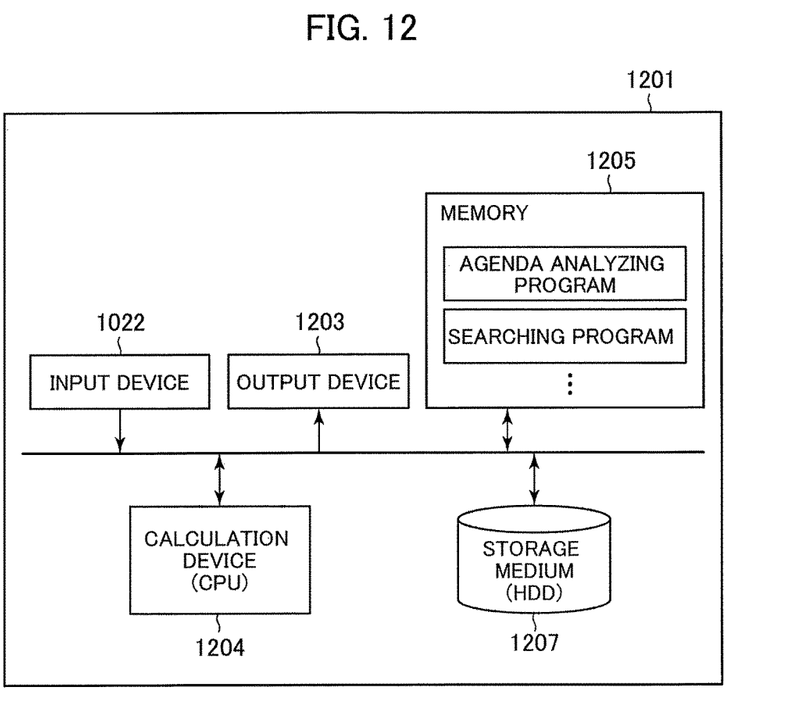
FIG. 12 is a diagram showing a hardware configuration example of a debate system according to the present invention.

Hereinafter, a sentence creation system according to a first embodiment of the present invention will be explained. The sentence creation system according to the first embodiment of the present invention is a system including a creation system composed of a combination of nine modules and a data management system. A concrete hardware configuration example is as shown in FIG. 12, and includes an input device 1202, an output device 1202, a memory 1205 for recording programs that executes the respective modules, and a storage device 1207 including a text data DB, a text annotation data DB 113, and the like.

Figure 1:
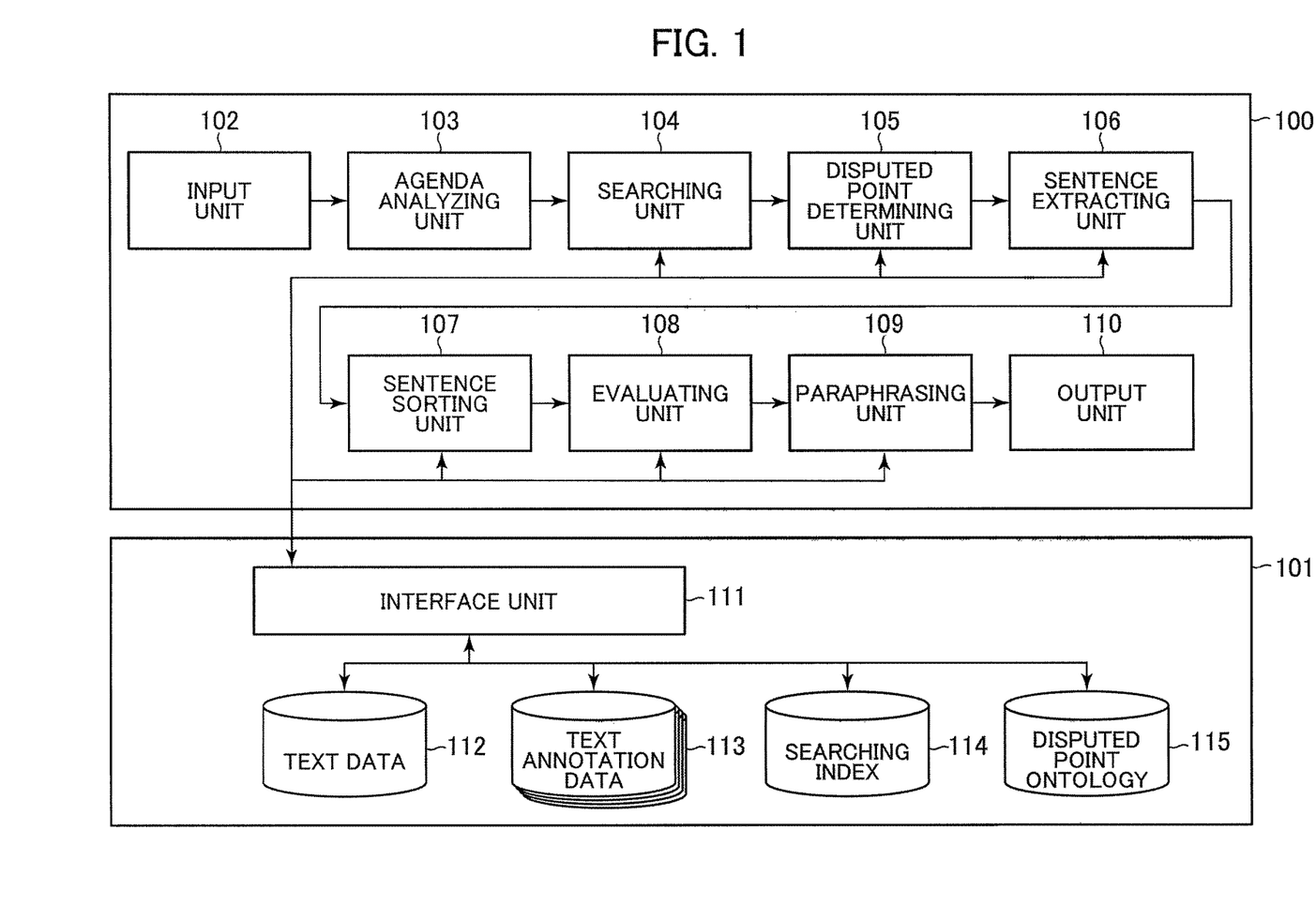
FIG. 1 is a diagram showing a sentence creation system according to the present invention.

FIG. 1 represents the entire image of the system. The reference sign 100 denotes a creation system that outputs an essay in which opinions on an agenda are described when the agenda is input. The reference sign 101 denotes a data management system in which preprocessed data are stored and that can be accessed by the system 100.

In the system 100, the nine modules are sequentially executed. First, the input unit 102 receives an agenda input by a user. Furthermore, the input unit 102 can receive an input indicating which opinion is desired to be created, a positive opinion, or a negative opinion, on the agenda. To clarify the user's position for a sentence to be created in the above-mentioned way makes it possible for this system to be used in such a debate style discussion.

Next, an agenda analyzing unit 103 analyzes the agenda, and judges the polarity of the agenda and a keyword used for searching. Next, a searching unit 104 searches for articles using the keyword and a disputed point word showing a disputed point in the debate. If the agenda is, for example, "A casino should be shut down", "casino", which is a noun clause, is considered to be a keyword. In addition, it can be determined whether a positive disputed point word should be used for "casino" or a negative disputed point word should be used through judging the polarity. Here, a disputed point word refers to any one of all the words in a disputed point ontology shown in FIG. 3, and especially a "disputed point" refers to any one of "words each of which represents a value concept being a point at issue under discussion" listed in the column 300. Furthermore, a "promotion word" refers to any one of "events that promote disputed points" listed in the column 301. On the other hand, a "suppression word" refers to any one of "events that suppress disputed points" listed in the column 302.

If it is desired that a positive opinion is output on the above agenda, searching is executed by selecting "casino" as a keyword and a "suppression word" which suppresses a casino as a disputed point word. In this case, since the agenda is negative for "casino", processing, in which the "suppression word" is used as a disputed point word, is executed. Plural suppression words are listed in FIG. 3, and to execute searching using "casino" a combination of one of such disputed point words and the keyword makes it possible to search for articles describing the pros and cons of casinos. In a case of using only a keyword extracted from an agenda, articles which need not be taken into consideration in a debate such as advertising articles about casinos and Weblog articles that make only remarks on visits to casinos are included in the searching result, therefore appropriate searching cannot be executed.

Next, a disputed point determining unit 105 classifies the output articles, and determines a disputed point used for creating opinions. Next, a sentence extracting unit 106 extracts sentences in which the disputed point is described among the output articles. Next, a sentence sorting unit 107 creates sentences by sorting the extracted sentences. Next, an evaluating unit 108 evaluates the created sentences. Next, a paraphrasing unit 109 inserts appropriate conjunctions, and deletes unnecessary expressions. Next, an output unit 110 outputs the most highly evaluated sentence as an essay describing opinions.

The data management system 101 includes four databases and an interface/structuralizing unit 11. An interface DB 111 provides access means to data that are managed by databases. The text data DB 112 is text data including news articles and the like, and the text annotation data DB 113 is data attached to the text data DB 112. A searching index DB 114 is an index that enables the text data DB 112 and the annotation data DB 113 to be searched. Disputed point ontology DB 115 is a database in which disputed points, which are often discussed in debates, are associated with the related words.

Next, after the data management system 101 is explained, the respective units of the system 100 will be explained.

Data stored in the text data DB 112 are text data including news articles and the like. Sentences appropriate for composing opinion sentences are extracted from these text data, and the extracted sentences are arranged to create an essay. Therefore, the text data DB 112 is a data source for sentences composing an output essay. The text data DB 112 are composed of English and Japanese news articles cloned from the Internet. For example, a doc_id is attached to each data as an identifier to manage each data.

Figure 2:
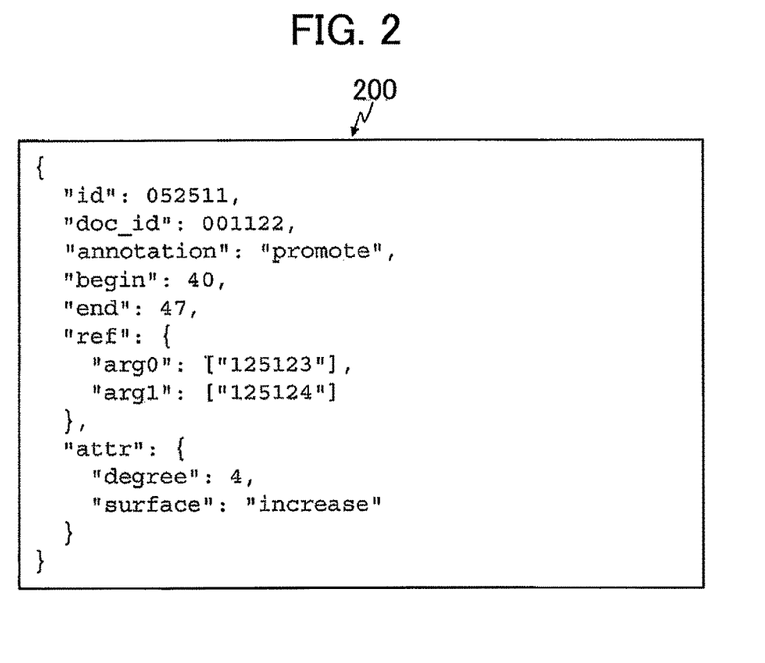
FIG. 2 is a diagram showing text annotation data.

The text annotation data DB 113 is a database that stores data attached to the text data DB 112. FIG. 2 shows an example of a text annotation data. The sign "id" is an identifier unique to an annotation. The sign "doc_id" represents the "id" of a news article stored in the text data DB 112. The sign "annotation" represents a kind of annotation. Kinds of annotations will be described later. The sign "begin" represents the start position of the annotation, and the example shown in FIG. 2 represents that this annotation starts at the $24^{th}$ character in an article whose "doc_id" is 001122 in the text data. The sign "end" represents the end position of the annotation, and the example shown in FIG. 2 represents that this annotation ends at the $29^{th}$ character in the article whose doc_id is 001122 in the text data 112. The sign "ref" represents the references to other annotations, and the example shown in FIG. 2 represents that this annotation has a link named "arg0" to an annotation with its id 125123, and a link named "arg1" to an annotation with its "id" 125124. The sign "attr" represents the attributes of this annotation, and has arbitrary hash values.

How to attach text annotation data will be explained taking a text data "Experts said that casinos dramatically increase the number of crimes." as an example. This sentence mentions a demerit brought about by casinos, which is useful for creating an essay about casinos. Since it is understandable that the word "casinos" promotes "the number of crimes" judging from the word "increase", an annotation "promote" is attached to the word "increase". Here, because the word "increase" are written starting at the $40^{th}$ character and ending at the $47^{th}$ character of the text data "Experts said that casinos dramatically increase the number of crimes.", "begin"=40 and "end"=47 are obtained. In addition, because a promotion actor is "casinos", another annotation "promote_arg0" is attached to "casinos". Let's assume that the id of "promote_arg0" attached to "casinos" is 125123. The "id" of an annotation is automatically given by the system so that the "id" is unique to the annotation. In this case, in order to make the relationship between "increase" and "casinos" understandable, a link is provided from "promote" annotation of "increase" to "promote_arg0" of "casinos". This is what ["arg0": ["125123"]] in FIG. 2 means. Furthermore, because the degree of promotion is presumed strong judging from the word "dramatically", "degree"=4 is set. The sign "surface" of "attr" shows what kind of word is used in the representation on the text data, and in this example, because the representation on the text data for "promote" is "increase", "surface"=increase is set.

There are eight kinds of annotations, that is to say, "positive", "negative", "promote", "promote_arg0", "promote_arg1", "suppress", "suppres_arg0", and "suppress_arg1". "Positive" is an affair having a positive value, and includes representations on a natural language such as "benefit", "ethic", and "health". "Negative" is an affair having a negative value, and includes representations on a natural language such as "disease", "crime", and "risk". "promote" is a representation representing promotion, and includes, for example, "increase", "invoke", and "improve". "promote_arg0" is a promotion actor, "promote_arg1" is a promoted event, and these annotations are attached after being identified from surrounding syntactic information when promote annotations are attached as described above. In a similar way, "suppress" is a representation showing suppression, and includes, for example, 'decrease', 'stop', and 'worsen'. "suppress_arg0" is a suppression actor, "suppress_arg1" is a suppressed event, and they are attached after being identified from the surrounding syntactic information when suppress annotations are attached as described above.

These annotations can be created by applying rules, which are made in advance, to the result of syntax analysis of text data as described above. Alternatively, these annotations can be created by a machine learning method referred to as a sequential labeling such as a CRF++ and the like.

The searching index DB 114 is index data used for enabling the text data DB 112 and the text annotation data DB 113 to be searched. As for index data used for keyword searching, the statistical amounts of characteristic words in each text data are calculated for similarity searching using, for example, TF-IDF, and the vector values of the statistical amounts are stored as indexes for similarity searching. Alternatively, searching indexes can be automatically created by inputting text data or text annotation data into an API of Solar for creating indexes using the software of Solar or the like.

Figure 3:
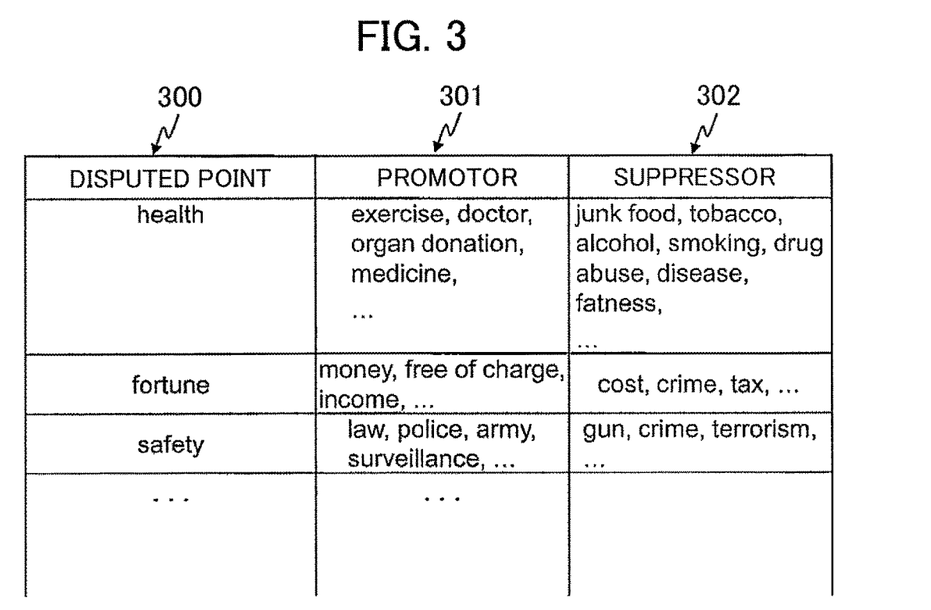
FIG. 3 is a diagram showing an example of disputed point ontology.

The disputed point ontology DB 115 is a database in which disputed points, which are often discussed in debates, are associated with the related words. FIG. 3 shows an example of a disputed point ontology stored in the disputed point ontology DB 115. A column 300 represents the values of disputed points often discussed in debates. A column 301 represents promoters that promote the values of the disputed points. A column 302 represents suppressors that suppress the values of the disputed points. As an example of a disputed point, there is "health". This disputed point means that there are occasionally exchanges of opinions over a disputed point whether the value of health is increased or decreased in debates. In the example shown in FIG. 3, there are "exercise", "doctor", "organ donation", and "medicine" as promoters for the value of "health". As suppressors for the value of "health", there are "junk food", "tabacco", "alcohol", and "smoking". The disputed point ontology is a database composed of fifty rows at most, and this is manually created with reference to past debates.

The interface unit 111 is an interface that provides an access means to the text data DB 112, the text annotation DB 113, the searching index DE 114, and the disputed point ontology DB 115, and the interface unit 111 is implemented using a technology such as REST.

Next, the respective units of the system 100 will be explained.

The input unit 102 receives an agenda from a user. The agenda is input from a GUI such as a Web browser or the like. An example of the agenda is "We should ban smoking in train stations" or the like. In addition, it is also conceivable that the setting of the number of candidates for the after-mentioned output sentence and the like are input into the input unit 102.

Figure 4:
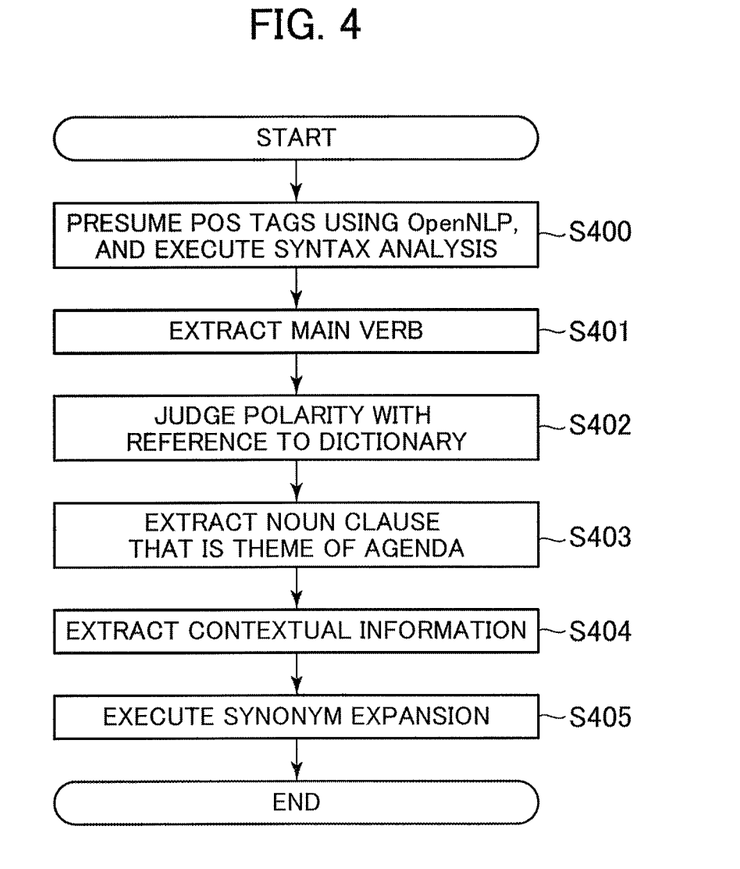
FIG. 4 is a diagram showing the operation of an agenda analyzing unit 103.

FIG. 4 is a flowchart showing the operation of the agenda analyzing unit 103. Using OpenNLP or the like, POS tags of words included in the agenda are presumed, the syntax of the sentence of the agenda is analyzed, and a syntax analysis tree is created at step S400. A main verb taking a leading part is extracted at step S401. Through tracking the syntax analysis tree, verbs are searched for, and a verb found nearest to ROOT is extracted as the main verb. Furthermore, the numbers of the appearances of negative expressions such as "Not" and the like is counted during the tracking period needed to reach the main verb, and it is judged that, if the number is odd, there is a negative expression, and if even, there is no negative expression (in a case of double negation or the like). For example, in the case of the agenda "We should ban smoking in train stations", a verb "ban" is extracted, and because a negative expression is not associated with "ban", it is judged that there is no negative expression.

At step S402, the polarity of the agenda is judged with reference to a dictionary. In the dictionary, verbs taking a positive standpoint to a subject such as "accept," "agree", and verbs taking a negative standpoint to a subject such as "ban," "abandon" are separately stored. In the above example, "ban" is judged to be a verb taking a negative standpoint with reference to the dictionary. By combining this judgment and the above-extracted result whether there is a negative expression or not, the polarity of the theme of the agenda is finally judged. In this example, the polarity is judged to be negative. On the other hand, in a case of an agenda "We should not ban smoking", this is a negative expression, and "ban" is a verb taking a negative standpoint, therefore the polarity of this agenda is judged to be positive. The polarity judged here means the polarity toward a noun clause extracted at the next step S403.

Next, a noun clause that is the theme of the agenda is extracted at step S403. Only subtrees that have syntax tags of "ROOT", "S", "NP", "VP", or "SBAR" of the syntax analysis tree of the agenda are tracked starting from "ROOT", and noun clauses that appear on the way are extracted. For example, in the case of the agenda "We should ban smoking in train stations.", "smoking" is extracted. Next, contextual information is extracted at step S404. Among words included in the agenda, words whose POS tags are "CC", "FW", "JJ", "JJR", "JJS", "NN", "NNP", "NNPS", "NNS", "RP", "VB", "VBD", "VBG", "VBN", "VBP", or "VBZ", and that are not extracted at step S401 and step S403 are extracted as contextual information. For example, in the case of the agenda "We should ban smoking in train stations", "train" and "stations" are extracted.

Next, synonym expansion is executed at step S405. The synonyms of the words extracted at steps S401, S403, and S404 are derived using the dictionary. As the dictionary, for example, WordNet may be used. For example, in the case of the agenda "We should ban smoking in train stations.", "smoking" is extracted as a noun clause, "smoke", and "fume" are derived as the synonyms of "smoking". In a similar way, synonyms of the verb extracted at step S401 and synonyms of the words that express the contextual information and are extracted at step S404 are also derived. As mentioned above, in the agenda analyzing unit 103, a main verb, the polarity of an agenda, a noun clause that is the theme of the agenda, contextual information, and synonyms relevant to the above words are extracted from the agenda. These words are used in the latter stages.

Figure 5:
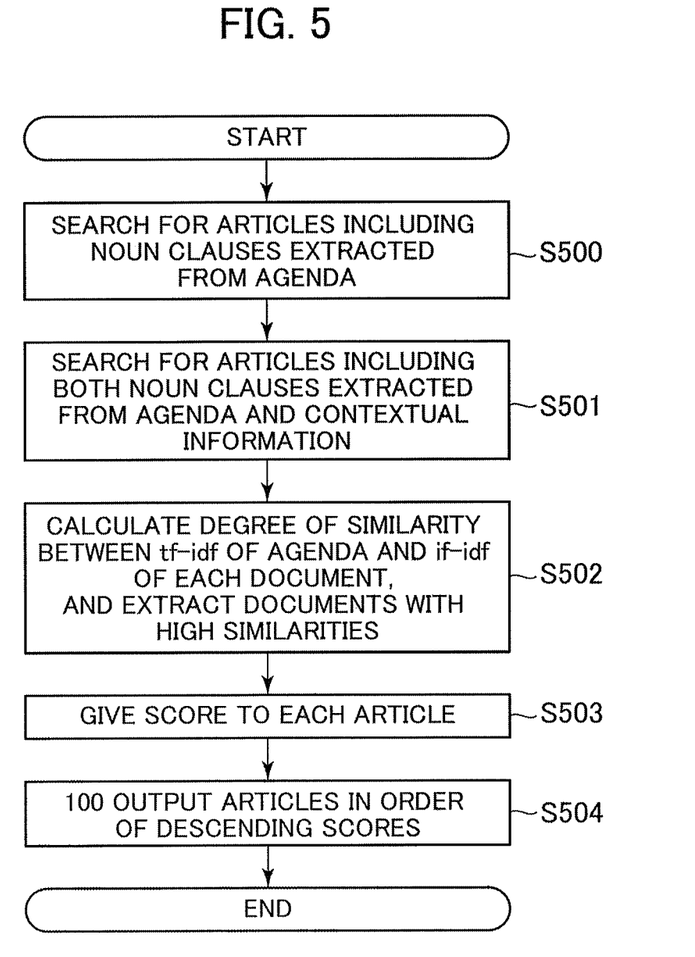
FIG. 5 is a diagram showing the operation of a searching unit 104.

FIG. 5 is a flowchart the operation of the searching unit 104. At step S500, articles including noun clauses extracted from the agenda are searched for from the text data DB 112 using keyword searching indexes stored in the searching index DB 114, and top 1000 articles are retrieved. In a similar way, at step S501, articles including both the noun clauses extracted from the agenda and contextual information are searched for from the text data 112 using keyword searching indexes stored in the searching index 114, and top 1000 articles are retrieved. The searching at step S501 is the same as the searching at step S500 except that it is executed with the contextual information added as a keyword. Next, at step S502, TF-IDFs, which are the statistical amounts of characteristic words in the agenda, are calculated, and 1000 TF-IDFs which are near to the TF-IDF vectors of respective articles shown by indexes for similarity searching of the searching index 114 in terms of Euclidean distances are extracted. Executing three different searches with wide variations brings about an advantageous effect in that searching errors by oversight can be prevented from occurring.

Next, each of 3000 articles extracted at step S503 is given a score using the next expression.

score=(the number of times noun clauses extracted from the agenda appear)+the number of times words in the disputed ontology appear)−the antiquity of the article Assuming that the latest year is 2014, the antiquity of an article published in 2014 is 0, the antiquity of an article published in 2013 is 1, and the antiquity of an article published in 2012 is 2. Next, at step S504, 100 articles among the above articles are output in the order of descending scores. As described above, by giving a higher score to an article having the larger number of times the words appear, an article having a high relevance to an agenda or a disputed point can be found. In addition, by giving a score to the antiquity of an article, an article in which a newer data is reflected can be found, which can increase the persuasive power of a finally output sentence.

Figure 6:
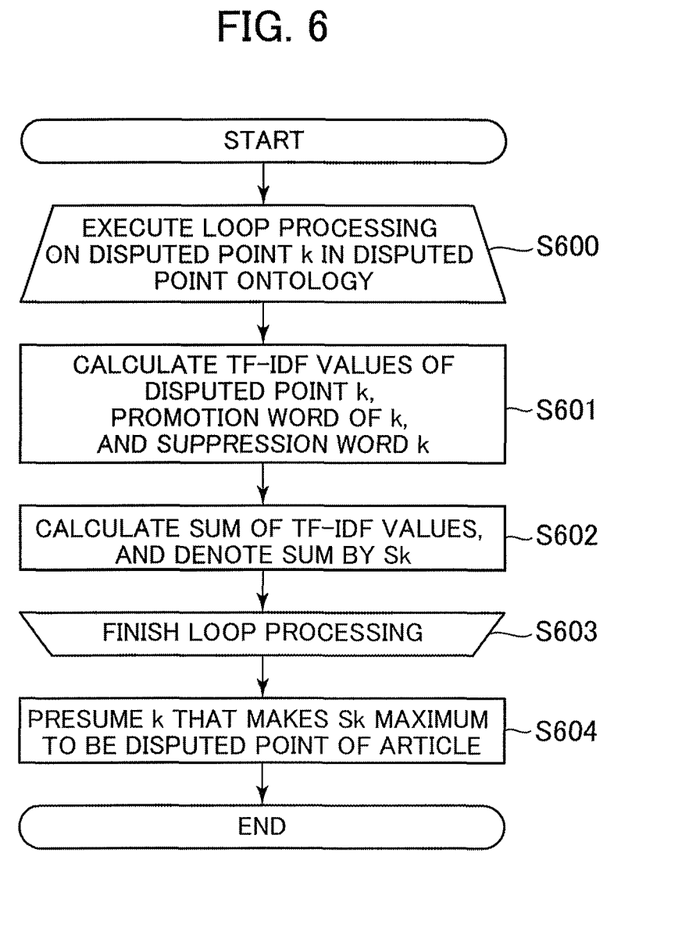
FIG. 6 is a diagram showing the operation of a disputed point determining unit 105.

FIG. 6 is a flowchart showing the operation of the disputed point determining unit 105. The flowchart shown in FIG. 6 is executed on each of articles output by the searching unit 104. At step S600, loop processing is executed on every disputed point k in the disputed point ontology. In the example shown in FIG. 3, k is "health", "fortune", or "safety", and the loop processing is executed on "health", "fortune", and "safety" in this order. At step S601, as for a disputed point k, a word that promotes k, and a word that suppresses kin the disputed point ontology, their TF-IDFs in the article are calculated. In actuality, because their TF-IDFs are included in the TF-IDF vector used for the similarity searching by the searching unit 104, the values relevant to their TF-IDFs are obtained from the searching index 114. Each word has its own TF-IDF value, therefore there are plural TF-IDF values for a disputed point k, a word that promotes k, and a word that suppresses k. At step S602, the sum of these TF-IDF values are calculated, and it is assumed that the sum will be denoted by Sk. At step S603, the loop processing is finished. At step S604, k that makes Sk maximum is presumed to be the disputed point of the article. This disputed point shows mainly to what value the entirety of the article is written in order to attach importance. As described above, a disputed point is judged for each article, and articles are grouped according to disputed points through after-mentioned processing to create a sentence, which makes it possible to create an opinion sentence in which a consistent assertion is made. Therefore, processing for determining a disputed point for each article becomes important.

Figure 7:
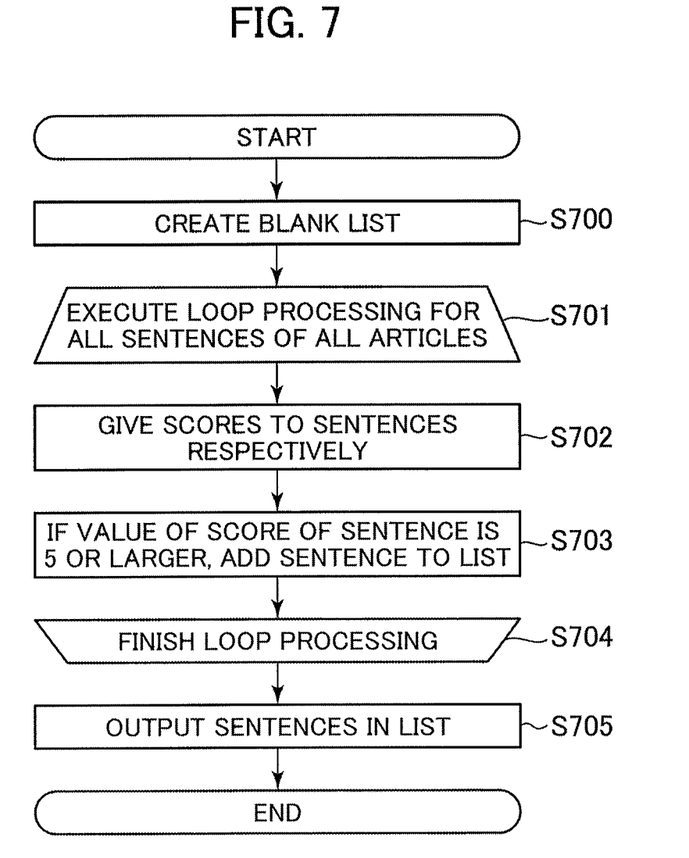
FIG. 7 is a diagram showing the operation of a sentence extracting unit 106.
Figure 8:
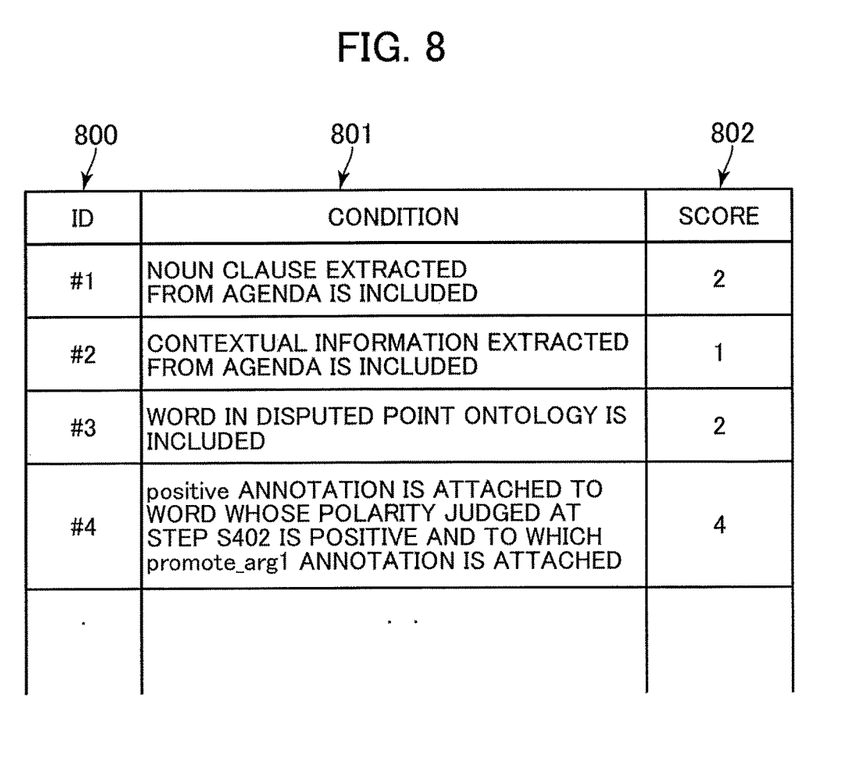
FIG. 8 is a diagram showing examples of score calculation conditions used in the sentence extracting unit 106.

FIG. 7 is a flowchart showing the operation of the sentence extracting unit 106. At step S700, a blank list for storing sentences output by the sentence extracting unit 106 is created. At step S701, loop processing is executed for all the sentences of the all the articles output by the disputed point determining unit. At step S702, sentences are Given scores under plural conditions shown in FIG. 8. The reference sign 800 denotes the ID of each condition, the reference sign 801 denotes each condition, and the reference sign 802 denotes a score that is given when each condition is satisfied. When respective conditions shown in FIG. 8 are satisfied, the relevant scores are added. The score of a sentence is the sum of all the scores. For example, a certain sentence satisfies only #1 and #4, the score of the sentence is 6. At step S703, if the value of the score of a sentence is 5 or larger, the sentence is added to the list created at step S700. At step S704, the loop processing is finished. At step S705, sentences in the list are output by the sentence extracting unit 106. With such a configuration, even in an article, sentences unrelated to the relevant agenda or disputed point can be dropped off from candidates used in the next sentence sorting unit.

Figure 9:
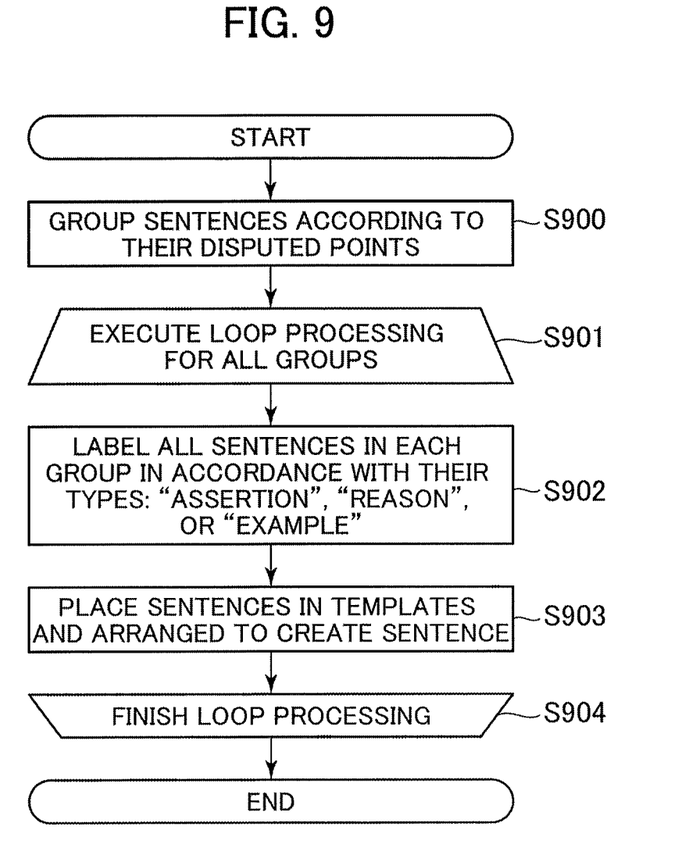
FIG. 9 is a diagram showing the operation of a sentence sorting unit 107.

FIG. 9 is a flowchart showing the operation of the sentence sorting unit 107. At step S900, sentences are grouped according to their disputed points. A disputed point for each sentence has always been presumed by the disputed point determining unit 105. Therefore, each sentence is grouped using its own disputed point which is extracted from each sentence as a key. For example, assuming that only five disputed points are determined by the disputed point determining unit 105, the sentences extracted by the sentence extracting unit 106 are classified into five groups. At step S901, loop processing is executed for all the groups. At step S902, all the sentences in each group are respectively labeled in accordance with a type to which each sentence belongs among types of "assertion", "reason", and "example". A machine learning method can be used for this labeling. Sentences are converted into characteristic amount vectors using, for example, a well-known method such as a Bag-of-words method, and these characteristic amount vectors can be classified using a machine learning method such as an SVM.

Next, at step S903, the sentences are placed in templates and arranged to create an essay. For example, in a case of a template in which "assertion," "reason", "example", "assertion", "reason", and "example" appear in this order, that is to say, "assertion", "reason", and "example" appear twice, first a sentence having the highest score, which is calculated by the sentence extracting unit 106, among sentences labeled with "assertion" in each group is selected. In a similar way, a sentence having the highest score among sentences labeled with "reason," "example", "assertion", "reason", or "example" is selected to be placed in the template in this order. At step S904, the loop processing is finished.

In this way, the sentence sorting unit 107 creates essays regarding plural disputed points. Subsequently, plural essays created by the sentence sorting unit 107 are evaluated by the next evaluating unit 108, hence the disputed point in the final output sentence, that is to say, the standpoint or value concept of an essay according to this system is first determined. In such a way, by creating an essay using only sentences extracted from articles regarding the same disputed point, a sentence that argues about the disputed point in a consistent standpoint can be created.

Figure 10:
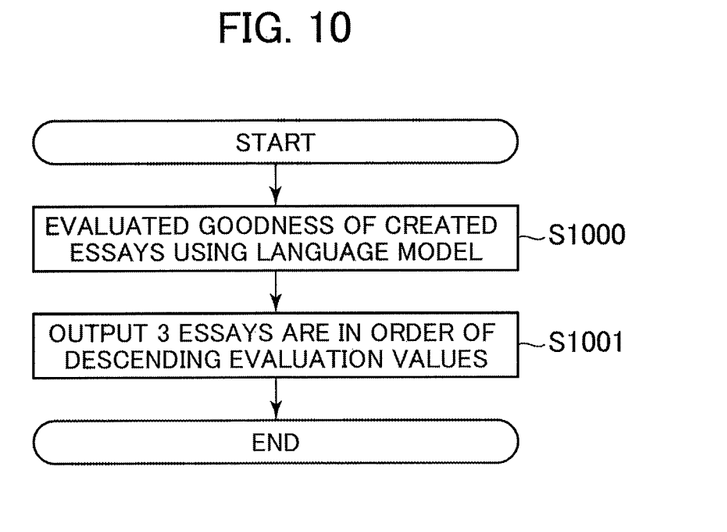
FIG. 10 is a diagram showing the operation of an evaluating unit 108.

FIG. 10 is a flowchart showing the operation of the evaluating unit 108. The evaluating unit 108 considers sentences created by the above sorting as candidates for an essay in which an opinion on an agenda is expressed, evaluates the candidates, and makes candidates with high evaluated values final outputs. At step S1000, the goodness of the created essays is evaluated using a language model. This evaluation processing can be executed using a method similar to a method used in a statistical machine translation. To put it concretely, data in essays made by human beings are collected first, and these data are modeled in advance using a well-known method such as an n-gram language model or a neural network language model. By calculating the likelihoods of the created essays in comparison with thus-created evaluation model, an essay with a high likelihood can be output as an essay with a high evaluation value. It goes without saying that the evaluation method of the created essays is not limited to the above method, and alternatively the created essays can be evaluated using any of other well-known methods and heuristic rules and standards.

At step S1001, three essays are output in the order of descending evaluation values. Essays, which have been grouped by the sentence sorting unit 107 into the groups corresponding to the disputed points respectively, are input into the evaluating unit 108. At step S1001, finally three essays are output. In this embodiment, although it is assumed that the present system is configured to output three sentences in order for a user to be able to grasp the contents of the sentences in a short time, the number of sentences to be output can be changed by the user's setting which is input in the input unit. With such a configuration of this system, this system can be used in accordance with the knowledge level of the user.

Figure 11:
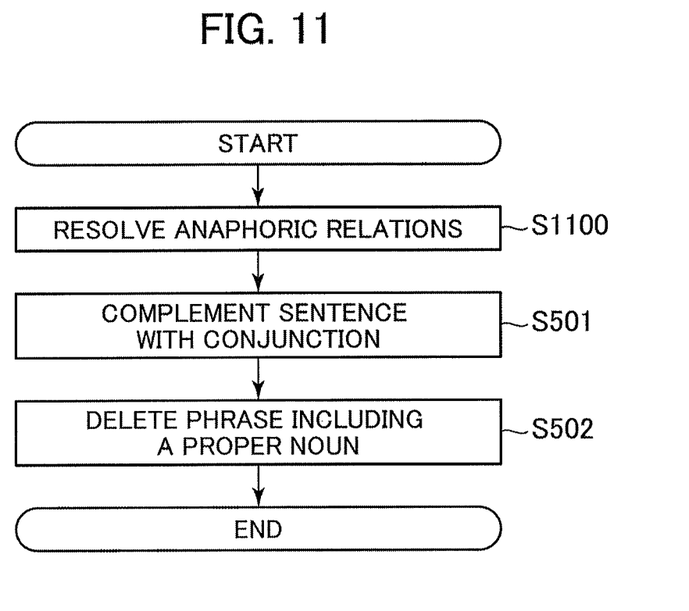
FIG. 11 is a diagram showing the operation of a paraphrasing unit 109.

FIG. 11 is a flowchart showing the operation of the paraphrasing unit 109. At step S1100, misalignments in anaphoric relations are corrected. To put it concretely, in each sentence of an essay, coreference resolution is executed on a source article from which each sentence is extracted using the above-mentioned OpenNLP. Using the above result, a noun or a proper noun that is a referent of a pronoun in the sentence of the essay is found and the pronoun is replaced by the noun or the proper noun. At step S501, sentences are complemented with conjunctions. As for two successive sentences in the essay, if there is a conjunction at the head of the latter sentence, the conjunction is deleted. Subsequently, a vector synthesized from the Bag-of-words vector of the former sentence and the Bag-of-words vector of the latter sentence is set as a characteristic amount, and a conjunction is presumed using an SVM. At step S502, a phase including a proper noun is deleted. Only in a case where there is a clause including a proper noun in a sentence that is judged to be "assertion" by the sentence sorting unit 107, the clause is deleted.

For example, if there is a sentence "Expert said that casino dramatically increase the number of crimes in Kokubunji-shi.", this sentence is unnatural as a sentence that provides an abstract assertion of an essay because this sentence includes a proper noun, therefore the clause "in Kokubunji-shi" is deleted, and "Expert said that casino dramatically increase the number of crimes." is output. In this way, by complementing sentences with conjunctions and by equalizing the abstractness of plural sentences whose anaphoric relations IS corrected and that are sorted, a sentence that is comprehensible as an opinion sentence regarding a debate can be output.

The output unit 110 provides a user with an essay that is a final output from the system using a means such as a display. It goes without saying that the user can be provided with the essay using a synthesized speech other than a display. In an actual debate, the pros and cons state their own opinions respectively in conversation, therefore outputting the essay using the speech gives a higher feeling of presence to the user.

From the above description, it will be clearly understandable that the sentence creation system according to this embodiment is a sentence creation system for outputting an opinion sentence on an agenda, and this sentence creation system includes: an input unit into which the agenda is input; an agenda analyzing unit for analyzing the agenda and judging the polarity of the agenda and a keyword used for searching; a searching unit for searching for articles using the keyword and a disputed point word showing a disputed point in the discussion; a disputed point determining unit for determining the disputed point used for creating the opinion sentence; a sentence extracting unit for extracting sentences in which the disputed point is described among the articles output by the searching unit; a sentence sorting unit for creating sentences by sorting the extracted sentences; an evaluating unit for evaluating the sentences; a paraphrasing unit for inserting appropriate conjunctions into the sentences; and an output unit for outputting the most highly evaluated sentence among the plural sentences as the opinion sentence.

Furthermore, the sentence creation method according to this embodiment is a sentence creation method for outputting an opinion sentence on an agenda, and this sentence creation method includes: a first step for inputting the agenda; a second step for analyzing the agenda and judging the polarity of the agenda and a keyword used for searching; a third step for searching for articles using the keyword and a disputed point word showing a disputed point in the discussion; a fourth step for determining the disputed point used for creating the opinion sentence; a fifth step for extracting sentences in which the disputed point is described among the articles output at the third step; a sixth step for creating sentences by sorting the extracted sentences; a seventh step for evaluating the sentences; an eighth step for inserting appropriate conjunctions into the sentences; and a ninth step for outputting the most highly evaluated sentence among the plural sentences as the opinion sentence.

As above, according to this embodiment of the present invention, a sentence in which opinions about a disputed point are described can be created by classifying articles, extracting sentences, and sorting sentences on the basis of the disputed point that is a pillar of the opinion sentence, which can bring about consistency to the opinion sentence. In addition, unlike in a case where information is collected about a predetermined disputed point when people express their opinions in debate, after sentences are created by searching for information on all disputed points, plural disputed points are uniformly evaluated, so that an opinion sentence with considerable persuasive power can be created regardless of the disputed points.

LIST OF REFERENCE SIGNS

100: Creation System
101: Data Management System
102: Input Unit
103: Agenda Analyzing Unit
104: Searching Unit
105: Disputed Point Determining Unit
106: Sentence Extracting Unit
107: Sentence Sorting Unit
108: Evaluating Unit
109: Paraphrasing Unit
110: Output Unit
111: Interface
112: Text Data DB
113: Text Annotation Data DB
114: Searching Index DB
115: Disputed Point Ontology DB

The invention claimed is:

1. A sentence creation system for automatically generating a final essay based on a topic identified in an agenda, the system comprising:
   an input that receives the agenda in a language;
   a memory that stores a first set of rules that define an essay template, a second set of rules that define a syntax of the language, and a third set of rules that define a language model for the language;
   a communication interface that is communicatively coupled to a plurality of databases of text information;
   a processor that is communicatively coupled to the input, the memory and the communication interface, wherein the processor:
   receives, using the input, the agenda,
   analyzes the agenda to extract a polarity of the agenda and a keyword;
   determines a disputed point that is associated with a disputed ontology based on the polarity and the keyword,
   searches, using the communication interface, the databases for articles using the keyword to locate a plurality of related articles;
   scores each of the plurality of related articles based on a number of times the disputed point appears and an age of the plurality of articles,
   selects a subset of the plurality of related articles based on the scores,
   extracts sentences in which the disputed point is described in the subset to form extracted sentences;
   organizes the extracted sentences according to the first set of rules to form a plurality of essays;
   inserts appropriate conjunctions into the plurality of essays to form respective complete essays according to the second set of rules;
   scores the respective complete essays according to the third set of rules, and
   selects the final essay based on the scores of the respective complete essays.

2. The system according to claim 1, wherein the databases further store:
   text data of the plurality articles,
   annotation data attached to the text data,
   searching indexes created from the text data and the annotation data, and
   a disputed point ontology that associates the disputed point.

3. The system according to claim 2, wherein the processor further:
   determines which word should be used as the keyword, or a promotion word, by judging the polarity of the agenda.

4. The system according to claim 1, wherein the processor further:
   adds, to each extracted sentences, a label indicating which type of "assertion", "reason", or "example" a sentence belongs to, based on a characteristic value of the extracted sentences.

5. A method for automatically generating a final essay based on a topic identified in an agenda, comprising:
   receiving an input of the agenda in a language;
   analyzing the agenda to extract polarity of the agenda and a keyword;
   determining a disputed point that is associated with a disputed ontology based on the polarity and the keyword,
   searching databases for articles using the keyword to locate a plurality of related articles;
   scoring each of the plurality of related articles based on a number of times the disputed point appears and an age of the plurality of articles;
   selecting a subset of the plurality of related articles based on the scoring;
   extracting sentences in which the disputed point is described in the subset to form extracted sentences;
   obtaining a first set of rules that define an essay template from a memory;
   organizing the extracted sentences according to the first set of rules to form a plurality of essays;
   obtaining a second set of rules that define a syntax of the language from the memory;
   inserting appropriate conjunctions into the plurality of essays to form respective complete essays according to the second set of rules;
   obtaining a third set of rules that define a language model for the language;
   scoring the respective complete essays according to the third set of rules; and
   selecting the final essay based on the scoring of the respective complete essays.

6. The method according to claim 5,
   wherein the databases further store:
   text data of the plurality of articles;
   annotation data attached to the text data;
   searching indexes created from the text data and the annotation data; and
   a disputed point ontology that associates the disputed point.

7. The method according to claim 6, further comprising:
   determining which word should be used as the keyword, or a promotion word by judging the polarity of the agenda.

8. The method according to claim 5, further comprising:
   adding, to each extracted sentences, a label indicating which type of "assertion", "reason", or "example" a sentence belongs to, based on a characteristic value of the extracted sentences.

* * * * *